(12) United States Patent
Uno et al.

(10) Patent No.: US 10,088,342 B2
(45) Date of Patent: Oct. 2, 2018

(54) ABNORMALITY DETECTION SYSTEM AND ABNORMALITY DETECTION METHOD

(71) Applicant: FUJITSU LIMITED, Kawasaki-shi, Kanagawa (JP)

(72) Inventors: Kazushi Uno, Atsugi (JP); Fumio Takei, Isehara (JP); Takeo Kasajima, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 15/216,107

(22) Filed: Jul. 21, 2016

(65) Prior Publication Data

US 2016/0327415 A1    Nov. 10, 2016

Related U.S. Application Data

(63) Continuation of application No. PCT/JP2014/055590, filed on Mar. 5, 2014.

(51) Int. Cl.
*G01D 5/353* (2006.01)
*G01K 11/32* (2006.01)

(52) U.S. Cl.
CPC ..... *G01D 5/35358* (2013.01); *G01D 5/35361* (2013.01); *G01D 5/35364* (2013.01); *G01K 11/32* (2013.01); *G01K 2011/324* (2013.01)

(58) Field of Classification Search
CPC .... G01K 11/32; G01M 11/39; G01D 5/35358
See application file for complete search history.

(56) References Cited

U.S. PATENT DOCUMENTS

| 4,823,166 A * | 4/1989 | Hartog | G01D 5/268 |
| | | | 250/227.19 |
| 5,592,282 A | 1/1997 | Hartog | |
| 5,731,869 A | 3/1998 | Minami | |
| 5,765,948 A | 6/1998 | Sai | |

(Continued)

FOREIGN PATENT DOCUMENTS

| JP | 60-049199 | 3/1985 |
| JP | 04-332835 | 11/1992 |
| JP | 08-247858 | 9/1996 |

(Continued)

OTHER PUBLICATIONS

PCT/JP2014/055590: International Search Report, dated Jun. 10, 2014.

*Primary Examiner* — Thanh Luu
(74) *Attorney, Agent, or Firm* — Kratz, Quintos & Hanson, LLP

(57) ABSTRACT

An abnormality detection system includes an optical fiber, a backscattered light detector, and a data processor. The backscattered light detector is connected to one end side and the other end side of the optical fiber, and configured to acquire a first intensity distribution of backscattered light by making light incident on the optical fiber from the one end side and to acquire a second intensity distribution of backscattered light by making light incident on the optical fiber from the other end side. The data processor calculates transmission loss at each position in the longitudinal direction of the optical fiber by using the first and second intensity distributions and a normalization function, and determines whether or not there is an abnormality based on the result of the calculation.

20 Claims, 18 Drawing Sheets

(56) References Cited

U.S. PATENT DOCUMENTS

2012/0033709 A1    2/2012  Kasajima et al.

FOREIGN PATENT DOCUMENTS

| JP | 09-018428 | 1/1997 |
| JP | 09-329415 | 12/1997 |
| JP | 2001-194191 | 7/2001 |
| WO | 2010/125712 A1 | 11/2010 |

* cited by examiner

POSITION OF OPTICAL FIBER (m)

ABNORMALITY DETECTION SYSTEM AND ABNORMALITY DETECTION METHOD

CROSS-REFERENCE TO RELATED APPLICATION

This application is a continuation of International Patent Application No. PCT/JP2014/055590 filed on Mar. 5, 2014 and designated the U.S., the entire contents of which are incorporated herein by reference.

FIELD

The embodiments discussed herein are related to an abnormality detection system and an abnormality detection method.

BACKGROUND

In a facility handling combustibles, explosives or hazardous materials, such as a chemical plant, a refinery, and a fossil-fuel power station, it is important to detect corrosion and wear of pipes and tanks in an early stage, thereby preventing a serious accident.

For that purpose, an abnormality detection system may be adopted, including a distributed temperature sensor (DTS) using an optical fiber as a temperature sensor.

In this kind of abnormality detection system, optical fiber is installed around a pipe or tank, for example, and end portion of the optical fiber is connected to the distributed temperature sensor. Then, laser beam is made to enter the optical fiber from the distributed temperature sensor, and Raman scattered light generated inside the optical fibers is detected by the distributed temperature sensor, thereby acquiring the temperature of the pipe, tank or the like. Based on the result thereof, it is determined whether or not there is an abnormality.

In a facility such as a chemical plant, a refinery, and a fossil-fuel power station, a delay in abnormality detection may lead to a serious accident. Thus, a system capable of detecting occurrence of an abnormality in an earlier stage is desired.

Note that the following patent document discloses a technique related to the present application.
Patent Document 1: Japanese Laid-open Patent Publication No. 09-18428
Patent Document 2: Japanese Laid-open Patent Publication No. 04-332835
Patent Document 3: International Publication Pamphlet No. WO 2010/125712

SUMMARY

According to one aspect of the disclosed technology, an abnormality detection system is provided which includes: an optical fiber; a backscattered light detector connected to one end side and the other end side of the optical fiber, and configured to acquire a first intensity distribution of backscattered light by making light enter the optical fiber through the one end side and to acquire a second intensity distribution of backscattered light by making light enter the optical fiber through the other end side; and a data processor configured to calculate transmission loss at positions in a longitudinal direction of the optical fiber by using the first and second intensity distributions and a normalization function, and to determine whether or not there is an abnormality based on a result of the calculation.

According to another aspect of the disclosed technology, an abnormality detection method is provided which includes: acquiring a first intensity distribution of backscattered light by making light enter through one end side of an optical fiber and acquiring a second intensity distribution of backscattered light by making light enter through the other end side of the optical fiber; and calculating transmission loss at positions in a longitudinal direction of the optical fiber by using the first and second intensity distributions and a normalization function, and determining whether or not there is an abnormality based on a result of the calculation.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Prior to descriptions of embodiments, a prelude is described below in order to facilitate the understanding of the embodiments.

In an abnormality detection system according to an embodiment, an abnormality is detected by using a change in transmission loss of an optical fiber due to application of stress.

Figure 1:
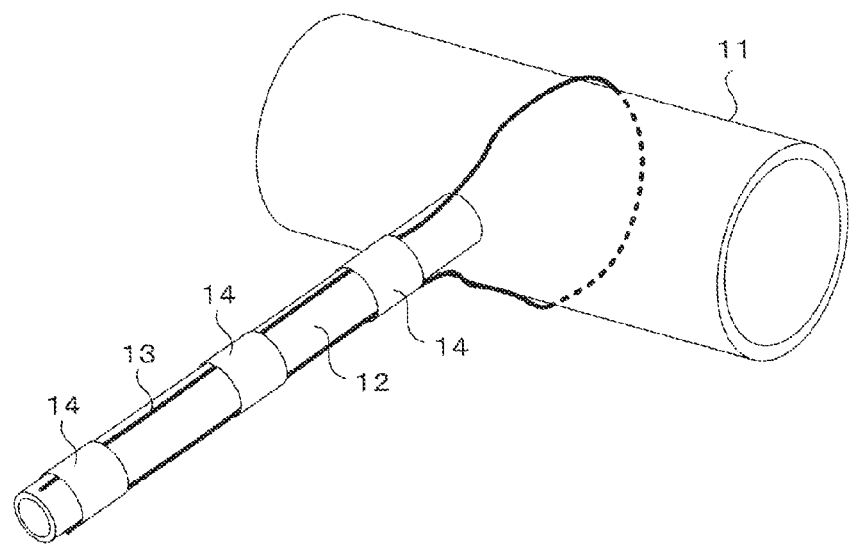
FIG. 1 is a diagram illustrating a state where an optical fiber is wound with a certain tension around a portion where a branch pipe is welded to a main pipe.

FIG. 1 is a diagram illustrating a state where an optical fiber 13 is wound with a certain tension around a portion where a branch pipe 12 is welded to a main pipe 11. The optical fiber 13 is partially fixed to the branch pipe 12 with tapes 14.

Along with operation or shutdown of a plant, the flow of a liquid or gas in the main pipe 11 and the branch pipe 12 is changed, and the temperature of the main pipe 11 and the branch pipe 12 is changed. This temperature change expands or contracts the main pipe 11 and the branch pipe 12, thus changing bending stress or tensile stress applied to the optical fiber 13.

When a certain degree or more of bending stress or tensile stress is applied to the optical fiber 13, the transmission loss is increased. Therefore, comparison between transmission loss during operation or during shutdown in the past and the current transmission loss makes it possible to determine whether or not there is an abnormality.

Figure 2:
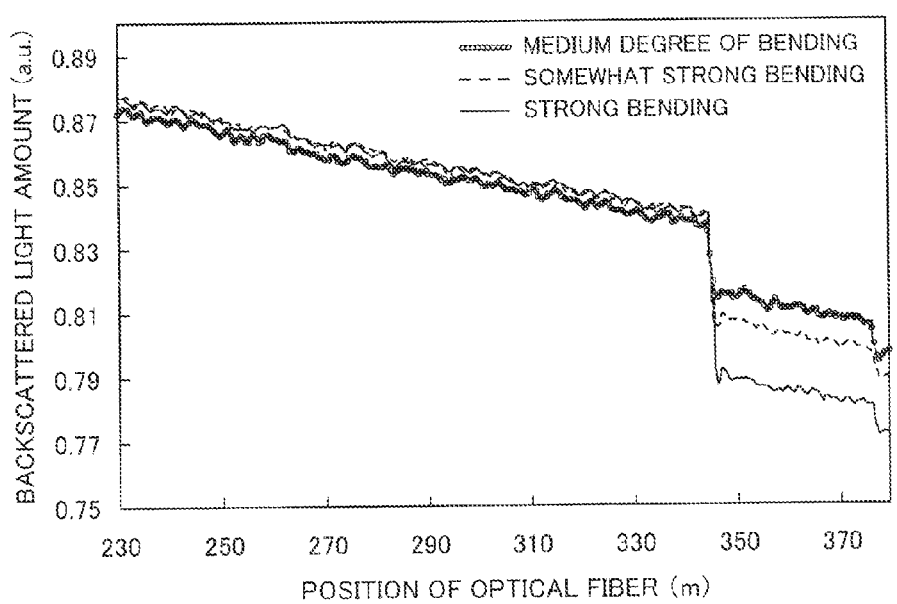
FIG. 2 is a graph illustrating a result of checking transmission loss when a medium degree of bending is applied to the optical fiber, when somewhat strong bending is applied thereto, and when strong bending is applied thereto.

FIG. 2 is a graph illustrating a result of checking transmission loss when a medium degree of bending is applied to the optical fiber, when somewhat strong bending is applied thereto, and when strong bending is applied thereto with the horizontal axis representing the position in the longitudinal direction of the optical fiber and the vertical axis representing the intensity distribution of backscattered light (backscattered light amount).

Figure 3A:
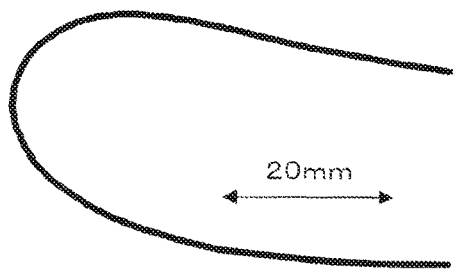
FIGS. 3A to 3C are diagrams specifically illustrating the medium degree of bending, somewhat strong bending, and strong bending.
Figure 3B:
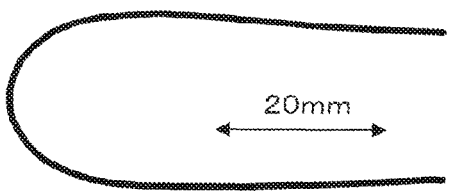
Figure 3C:
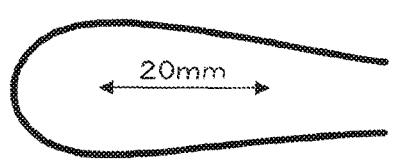

Note that the medium degree of bending is a degree of bending (bending radius of about 10 mm) illustrated in FIG. 3A, the somewhat strong bending is bending slightly stronger (see FIG. 3B) than that illustrated in FIG. 3A, and the strong bending is bending slightly stronger (see FIG. 3C) than that illustrated in FIG. 3B). Moreover, in FIG. 2, the intensity of the backscattered light is normalized based on the amount of light at the position of 0 m in the longitudinal direction of the optical fiber.

From FIG. 2, it may be seen that transmission loss corresponding to the degree of bending occurs at the position of about 340 m in the longitudinal direction of the optical fiber.

For example, it is assumed that a medium degree of bending is applied to the optical fiber during normal operation and a certain amount of transmission loss occurs at a specific position in the longitudinal direction of the optical fiber. In this case, if there is a drastic change in the transmission loss of the optical fiber, it may be determined that some kind of abnormality has occurred.

As may be seen from FIG. 2, the intensity of the backscattered light changes according to the position in the longitudinal direction of the optical fiber. For this reason, it is not possible to determine simply based on the intensity of the backscattered light whether or not there is an abnormality. Therefore, in order to automate abnormality detection, it is important to detect a change in intensity of the backscattered light.

Patent Document 1 describes a method intended to accurately measure the position of a connection portion of an optical fiber as well as connection loss, wherein the intensity distribution of backscattered light is second-order differentiated. It is conceivable to use this method for detecting whether or not there is an abnormality.

Figure 4:
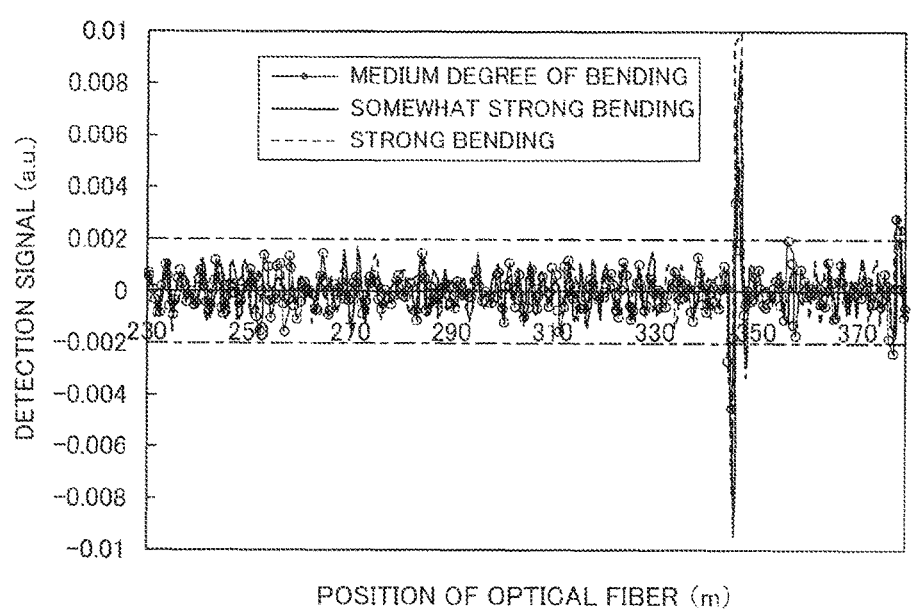
FIG. 4 is a graph illustrating a result of second order differentiation of the intensity distribution of the backscattered light illustrated in FIG. 2.

FIG. 4 is a graph illustrating a result of second order differentiation of the intensity distribution of the backscattered light illustrated in FIG. 2. The dashed dotted lines in FIG. 4 represent a range of 3σ (σ is a standard deviation).

As illustrated in FIG. 4, when the intensity distribution of the backscattered light is second-order differentiated, a change in intensity of the backscattered light is highlighted, making it possible to relatively accurately detect transmission loss and the position where the transmission loss has occurred.

However, in order to remove noise components, a threshold needs to be set to about 3σ. When the threshold is set to 3σ, a peak level of a portion of the medium degree of bending is slightly higher than a noise level. Thus, detection reliability is not high.

From FIG. 2, it may be seen that a difference in amount of the backscattered light at the position where somewhat strong bending is applied is about 2.4%. More specifically, it is not possible to accurately detect the occurrence of an abnormality with this method unless there is a change in light amount of 2.4% or more due to bending stress or tensile stress.

As described above, with the method for detecting an abnormality by performing second order differentiation of the intensity distribution of the backscattered light, it is not possible to detect an abnormality unless the transmission loss is increased to some extent. In other words, there is a problem that it is not possible to detect the abnormality in an early stage.

Moreover, in an installation path where a large and steep temperature gradient which exceeds 400° C., for example, when the intensity distribution of the backscattered light is second-order differentiated, large peaks are generated at the rising and falling portions of the temperature gradient. Then, a process is needed to determine whether such peaks are caused by the temperature gradient or by stress applied to the optical fiber. This also leads to a problem that the system becomes complicated.

In the following embodiment, description is given of an abnormality detection system and an abnormality detection method capable of detecting an abnormality in an early stage, which occurs in a facility such as a chemical plant, a refinery, and a fossil-fuel power station.

Embodiment

Figure 5:
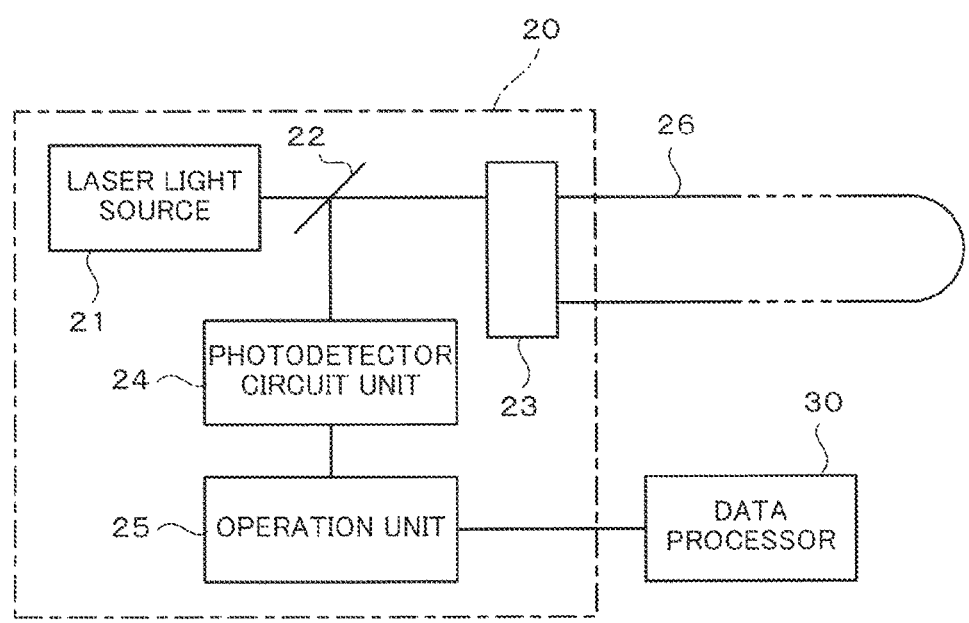
FIG. 5 is a block diagram illustrating an abnormality detection system according to an embodiment.

FIG. 5 is a block diagram illustrating an abnormality detection system according to an embodiment.

The abnormality detection system according to this embodiment includes a loop photodetector 20 and a data processor 30 configured to process data outputted from the loop photodetector 20. The loop photodetector 20 is an example of a backscattered light detection unit, and the data processor 30 is an example of a data processing unit.

The loop photodetector 20 includes a laser light source 21, a beam splitter 22, a transmission path switch 23, a photodetector circuit unit 24, and an operation unit 25. The loop photodetector 20 is used by being connected to an optical fiber 26. The optical fiber 26 has both ends thereof connected to the transmission path switch 23, is installed around the pipes 11 and 12 as illustrated in FIG. 1, for example, and is partially fixed to the pipes 11 and 12 with the tapes 14 or the like.

A laser beam having a predetermined pulse width is outputted from the laser light source 21 at a constant cycle. This laser beam penetrates the beam splitter 22 and enters the optical fiber 26 through the transmission path switch 23.

The transmission path switch 23 switches a transmission path of the laser beam at a constant cycle. More specifically, the transmission path switch 23 alternately switches between a state where one end side of the optical fiber 26 is optically connected to the beam splitter 22 (see FIG. 6A) and a state where the other end side of the optical fiber 26 is optically connected to the beam splitter 22 (see FIG. 6B).

The light having entered the optical fiber 26 is partially backscattered by molecules constituting the optical fiber 26. The backscattered light travels back through the inside of the optical fiber 26 and reaches the beam splitter 22 through the transmission path switch 23. Then, the backscattered light is reflected by the beam splitter 22 and reaches the photodetector circuit unit 24.

The photodetector circuit unit 24 is provided with a filter (not illustrated) configured to separate light having a predetermined wavelength and a light receiving element (not illustrated) configured to receive the light having the predetermined wavelength and separated by the filter. An electric signal corresponding to the intensity of the light received by the light receiving element is outputted from the photodetector circuit unit 24.

The operation unit 25 includes a computer. The operation unit 25 stores a temporal change of a signal outputted from the photodetector circuit unit 24, and outputs such data to the data processor 30.

The data processor 30 also includes a computer. Then, the data processor 30 processes data outputted from the photodetector 20 to determine whether or not there is an abnormality as described later, and executes preset processing such as putting out an alert when it is determined that there is an abnormality.

As the loop photodetector 20, an optical pulse detector (Optical Time Domain Reflectometer: OTDR) using Rayleigh scattered light may be used. Alternatively, a distributed temperature sensor (DTS) using Raman scattered light (Stokes light and anti-Stokes light) may be used. When the distributed temperature sensor is used as the photodetector 20, a measurement of a temperature distribution may be conducted together with the detection of an abnormality.

Note that the inventors of the present application have proposed a temperature measurement method for performing correction calculation using a transfer function for a temperature distribution detected by an optical fiber (Patent Document 3 and the like). According to this method, temperatures may be accurately detected at measurement points set at intervals of 10 cm to several 10 cm along the longitudinal direction of the optical fiber.

Figure 7:
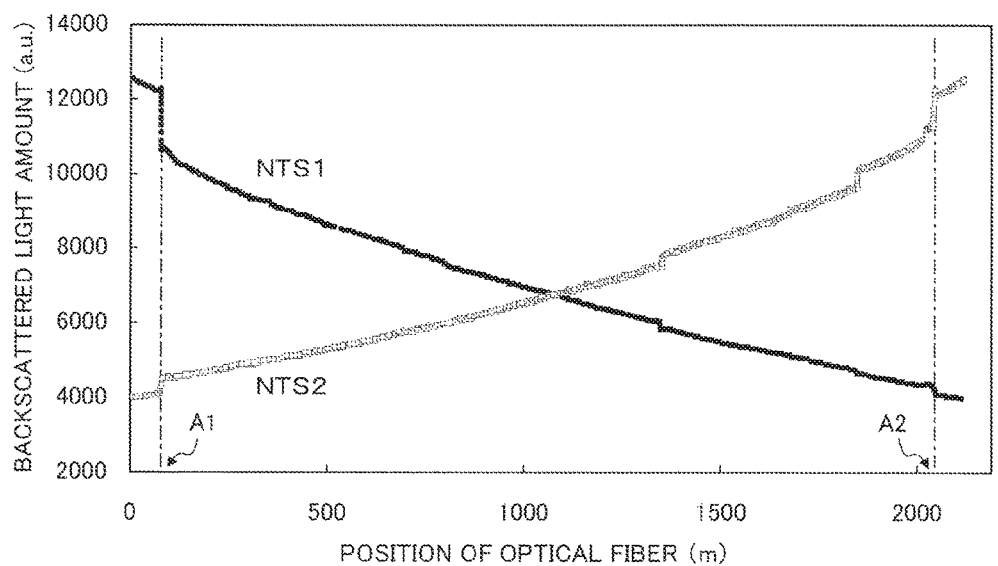
FIG. 7 is a graph illustrating an intensity distribution of first backscattered light NTS1 and an intensity distribution of second backscattered light NTS2.

FIG. 7 is a graph illustrating an intensity distribution of first backscattered light NTS1 and an intensity distribution of second backscattered light NTS2 with the horizontal axis representing the position in the longitudinal direction of the optical fiber 26 and the vertical axis representing the amount of backscattered light detected by the photodetector 20.

Figure 6A:
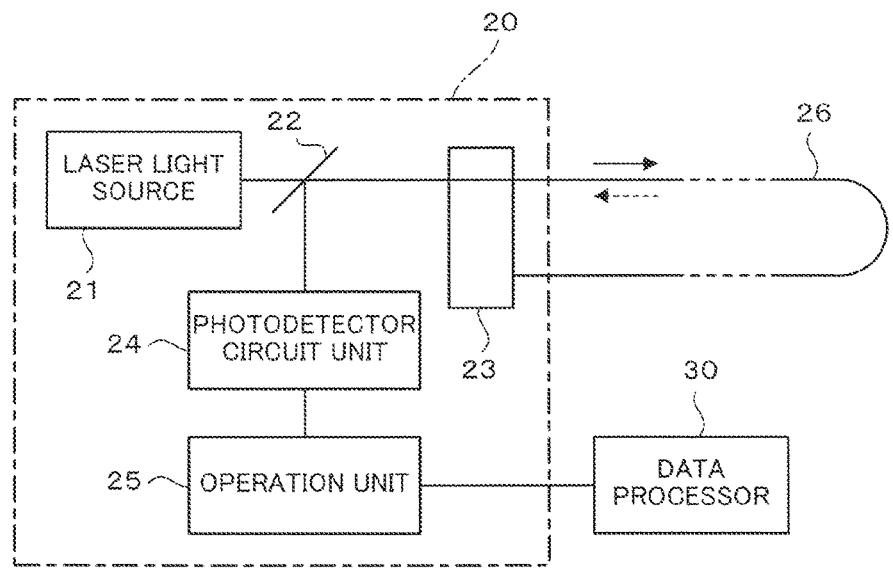
FIG. 6A is a diagram illustrating a state where one end side of the optical fiber is optically connected to the beam splitter.

Note that the horizontal axis in FIG. 7 represents a distance from a reference position (0 m), which is a predetermined position on the laser light source 21 side in a state where the photodetector 20 and one end side of the optical fiber 26 are optically connected to each other as illustrated in FIG. 6A. Moreover, transmission loss at the positions indicated by A1 or A2 in FIG. 7 occurs in a connector which optically connects the photodetector 20 to each of one end side and the other end side of the optical fiber 26.

Figure 6B:
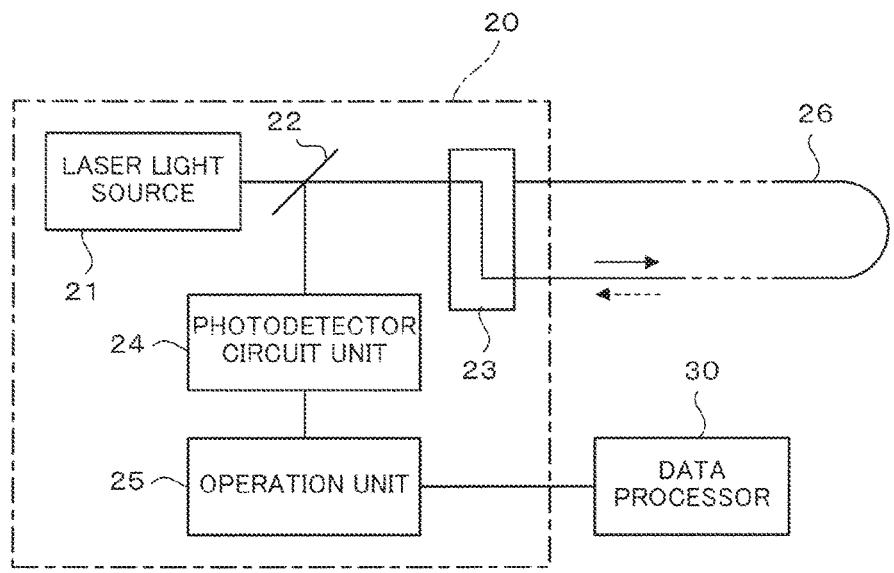
FIG. 6B is a diagram illustrating a state where the other end side of the optical fiber is optically connected to the beam splitter.

As illustrated in FIG. 6A, as to the amount of the backscattered light NTS1 when the laser beam is made incident from one end side of the optical fiber 26, the closer to the reference position (position of 0 m), the larger the amount, and the farther away from the reference position, the smaller the amount. Meanwhile, as illustrated in FIG. 6B, as to the amount of the backscattered light NTS2 when the laser beam is made incident from the other end side of the optical fiber 26, the closer to the reference position, the smaller the amount, and the farther away from the reference position, the larger the amount.

Figure 8:
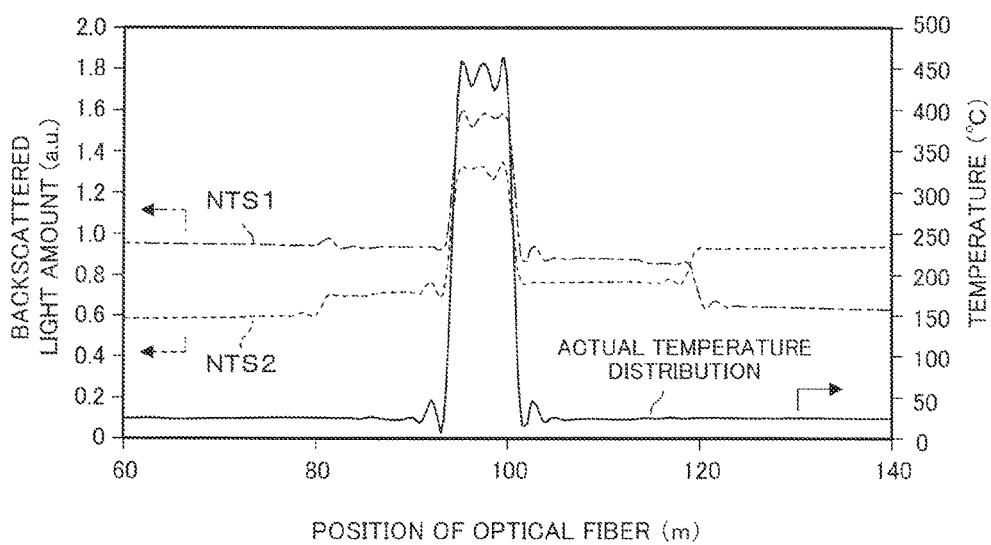
FIG. 8 is a graph illustrating a relationship between a temperature distribution (actual temperature distribution) when a section of the optical fiber is heated to 450° C. and the intensity distributions of the backscattered light NTS1 and NTS2.

FIG. 8 is a graph illustrating a relationship between a temperature distribution (actual temperature distribution) when a section of the optical fiber 26 is heated to 450° C. and the intensity distributions of the backscattered light NTS1 and NTS2.

Note that, here, a portion of about 92 m to about 100 m of the optical fiber 26 is heated to about 450° C., and external force is applied to the position of about 120 m. Also, a step at the position of 81.5 m of the optical fiber 26 is provided by an optical fiber connection portion (connector).

As may be seen from FIG. 8, at the position (about 92 m to about 100 m) with a large temperature difference, directions of changes in amounts of the backscattered light NTS1 and NTS2 are the same (hereinafter referred to as the "same phase") and the gains are also approximately the same. On the other hand, at the position (about 120 m) with an abnormality caused by the external force, the directions of changes in amounts of the backscattered light NTS1 and NTS2 are opposite (hereinafter referred to as "opposite phases").

Moreover, when the transmission loss is small at the optical fiber connection portion by the connector, fusion or the like, the backscattered light NTS1 and NTS2 may have the same phase as illustrated in FIG. 8. However, when a large transmission loss has occurred, the backscattered light NTS1 and NTS2 have the opposite phases.

From the above, it is found out that there is no problem with detection of an abnormality due to the external force even when the change in the amount of light (or the transmission loss) is suppressed by some kind of processing at the portion where the backscattered light NTS1 and NTS2 have the same phase. Moreover, a sufficient condition is obtained that the portion where the backscattered light NTS1 and NTS2 have the opposite phases is either one of the portion with an abnormality caused by the external force and the portion with a large transmission loss at the optical fiber connection portion.

Note that the abnormality caused by the external force is an abnormality in transmission loss caused by some kind of external force acting on the optical fiber, such as tension, bending or torsion.

In this embodiment, in order to detect the abnormality caused by the external force, the intensity distributions of the backscattered light NTS1 and NTS2 are normalized using a normalization function. By adding a suppression function to the normalization function, an influence of a temperature gradient is reduced.

The suppression function of the normalization function is described with reference to schematic diagrams of FIGS. 9 and 10.

When there is a large temperature gradient, a temperature difference between the both ends may be ignored. Moreover, influences of the temperature gradient on the changes in the amounts of the backscattered light NTS1 and NTS2 are approximately the same for the both backscattered light NTS1 and NTS2.

Figure 9:
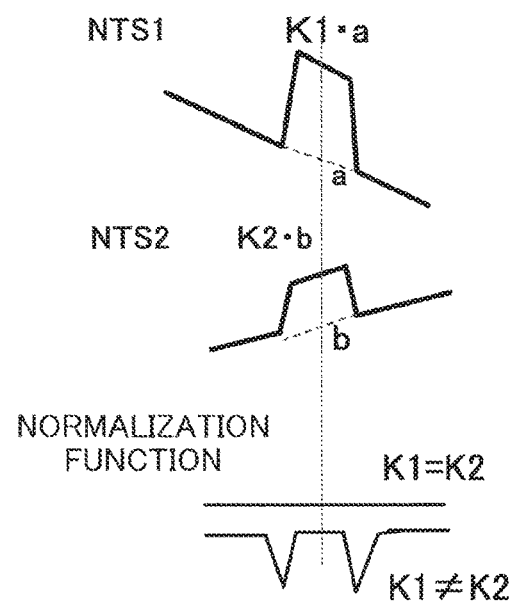
FIG. 9 is a schematic diagram (Part 1) for explaining a suppression function of a normalization function.
Figure 10:
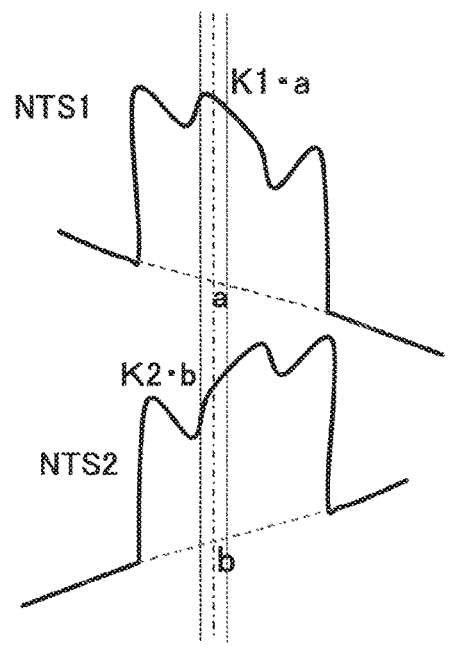
FIG. 10 is a schematic diagram (Part 2) for explaining the suppression function of the normalization function.

Therefore, as illustrated in FIG. 9, regions where the temperature difference may be ignored are connected by a straight line (indicated by a broken line in FIG. 9) in each of the intensity distributions of the backscattered light NTS1 and NTS2. Assuming that the light amounts at the midpoints of the straight lines are a and b, the actual light amounts of the backscattered light NTS1 and NTS2 may be represented as (K1·a) and (K2·b) where K1 and K2 are both positive real numbers.

Although actual temperature distributions are not uniform, the above relationship is established in any portion when a part thereof is cut out in rectangles. For example, even if a certain portion of the optical fiber is installed near a high-temperature boiler, both end portions thereof have room temperature or ambient temperature, and thus may be considered to have approximately the same temperature.

Therefore, the influence of the temperature gradient may be suppressed by setting conditions (1) that a constant value is obtained when K1=K2 and (2) that the value changes with respect to (1) when K1≠K2, for the normalization function.

In order to establish the above conditions (1) and (2), assuming that a distance from one end face of the optical fiber 26 is L, a function NTS1(L) of L is obtained by normalizing the intensity distribution of backscattered light, which is acquired by making an optical pulse incident from one end face of the optical fiber 26 at a certain time t1, with a maximum value thereof, for example.

Likewise, a function NTS2(L) of L is obtained by normalizing the intensity distribution of backscattered light, which is acquired by making an optical pulse incident from the other end face of the optical fiber 26 at a certain time t2 next to t1, with a maximum value thereof, for example.

Then, the normalization function needs the following two conditions: (3) that the normalization function is an even function with a central axis of NTS1(L)/NTS2(L)=1 when NTS1(L)/NTS2(L) is the horizontal axis (logarithmic axis) and (4) that the normalization function takes a maximum value or a minimum value when NTS1(L)=NTS2(L) and has a finite value even when either of the maximum value or the minimum value infinitely approaches zero.

The above condition (3) is because there is a possibility that one of the NTS1 (L) value and the NTS2(L) value is larger than the other depending on whether the target position is near one end face side of the optical fiber 26 or near the other end face side thereof. Even when the gain has the same value, the intensity of the optical pulse made incident from the other end face side of the optical fiber 26 is reduced on one end face side thereof, for example. Thus, the other end face side is more likely to be influenced by offset or quantization errors than one end face side.

If the function which satisfies such conditions (1) to (4) is the normalization function, changes in light amount are suppressed when the backscattered light NTS1 and NTS2 have the same phase and equal amplitudes. Hereinafter, a result of calculating a normalization function for each position (distance L) using NTS1(L) and NTS2(L) is called a normalized backscattering variation. At the position where a large step is generated in the normalized backscattering variation, the backscattered light NTS1 and NTS2 have the opposite phases or have the same phase but have different values.

As described above, since the transmission loss has a small value in the latter case, the step generated in the normalized backscattering variation is small. Therefore, it may be said that, at the position where a large step is generated in the normalized backscattering variation, a large transmission loss is caused by a poor connection state of the optical fiber connection portion or transmission loss is caused by external force.

By managing the position of the optical fiber connection portion when the optical fiber 26 is installed, for example, it may be determined whether or not the position where a large step is generated in the normalized backscattering variation is the optical fiber connection portion. Then, if the position where a large step is generated in the normalized backscattering variation is not the optical fiber connection portion, it may be determined that external force is applied to the position.

Note that, in this embodiment, a differential FIR (Finite Impulse Response) filter is used to highlight the step in the normalized backscattering variation. The differential FIR filter is described later.

Figure 11:
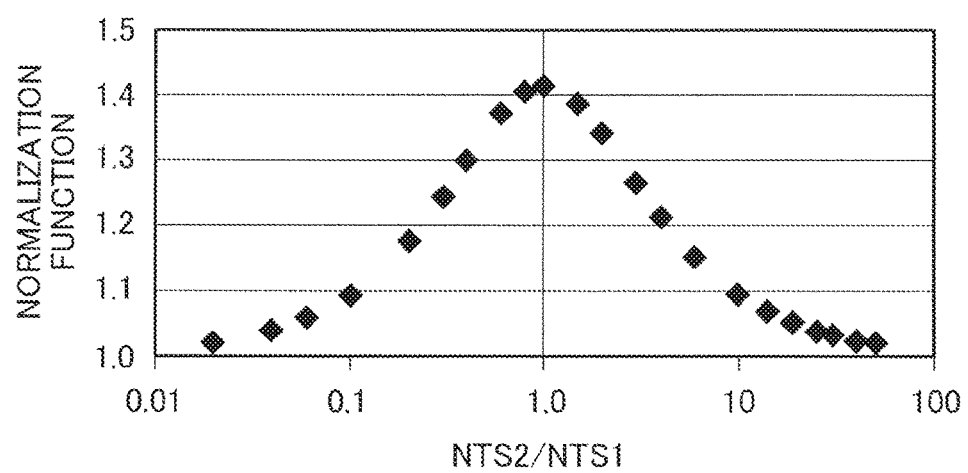
FIG. 11 is a diagram illustrating an example of the normalization function.

FIG. 11 illustrates an example of a normalization function. This normalization function is represented by the following expression (1).

[Expression 1]

$$\frac{(NTS1(L) + NTS2(L))}{\sqrt{(NTS1(L)^2 + NTS2(L)^2)}} \tag{1}$$

The following expression (2) is obtained by substituting K·a to NTS1(L) and K·b to NTS2(L) in the above expression (1).

[Expression 2]

$$\frac{K \cdot (a + b)}{K \cdot \sqrt{(a^2 + b^2)}} \tag{2}$$

In the expression (2), K in the denominator and K in the numerator are cancelled to obtain the following expression (3).

[Expression 3]

$$\frac{(a+b)}{\sqrt{(a^2+b^2)}} \qquad (3)$$

More specifically, in the normalized backscattering variation calculated using the normalization function, when the gains are equal, the position influenced by the ambient temperature and the position not influenced by the ambient temperature have the same value. The example illustrated in FIG. 9 indicates that the normalization using solid lines and the normalization using broken lines have the same value.

As the normalization function, a function represented by the following expression (4) using sufficiently large real numbers A for NTS1(L) and NTS2(L), which are not zero, may be used. Alternatively, a function represented by the following expression (5), in which the denominator and the numerator in the expression (1) are interchanged, may be used.

[Expression 4]

$$\frac{A \times (\sin(NTS1(L)/A) + \sin(NTS2(L)/A))}{\sqrt{(NTS1(L)^2 + NTS2(L)^2)}} \qquad (4)$$

[Expression 5]

$$\frac{\sqrt{(NTS1(L)^2 + NTS2(L)^2)}}{(NTS1(L) + NTS2(L))} \qquad (5)$$

Figure 12:
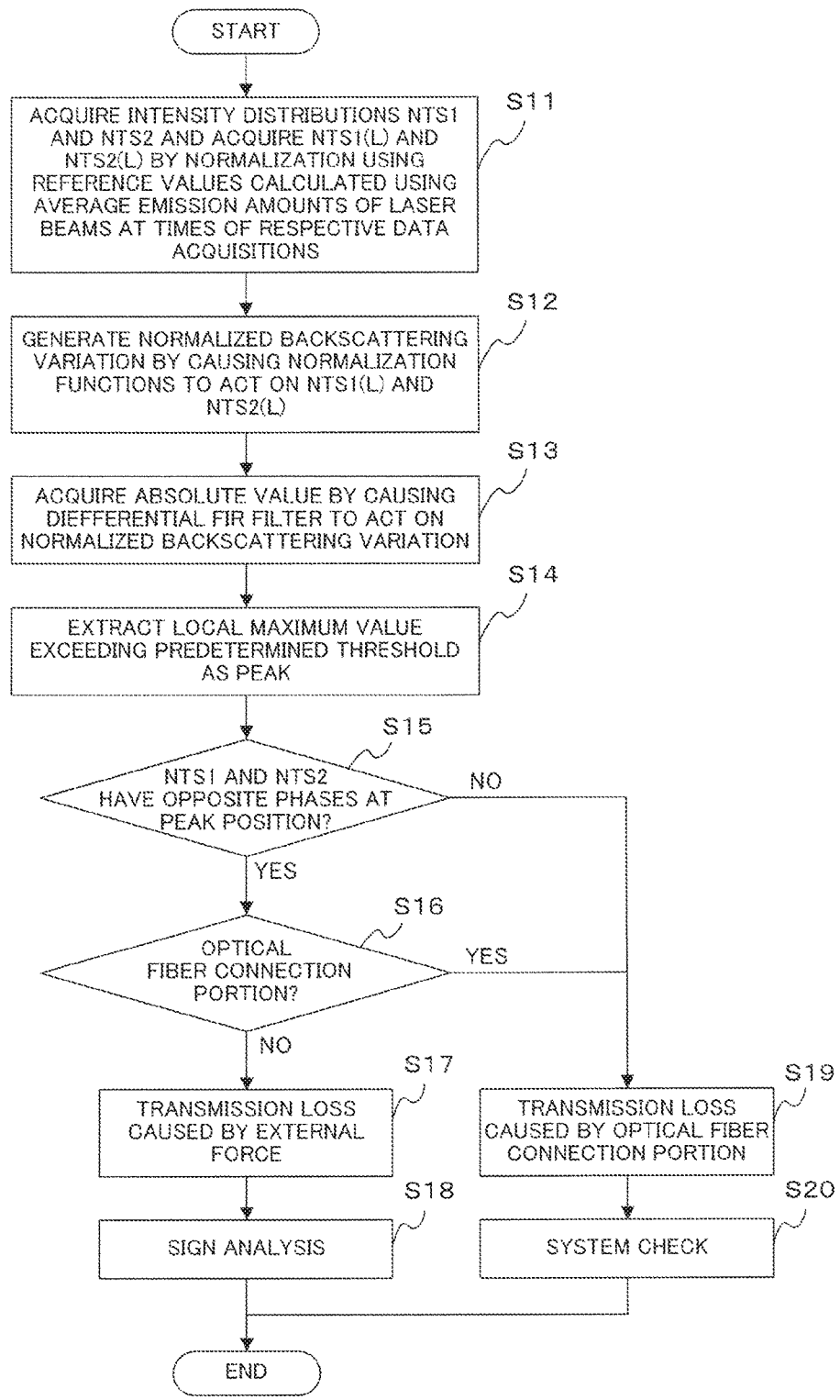
FIG. 12 is a flowchart illustrating an abnormality detection method using the abnormality detection system according to the embodiment.

FIG. 12 is a flowchart illustrating an abnormality detection method by the abnormality detection system according to this embodiment. Here, the block diagrams of FIGS. 6A and 6B are also referred to.

First, in Step S11, the data processor 30 acquires an intensity distribution of backscattered light NTS1 by making a laser beam incident from one end side of the optical fiber 26 (see FIG. 6A). Then, the data processor 30 uses a reference value generated using the amount of the laser beam at the time of data acquisition to normalize the intensity distribution of the backscattered light NTS1, thereby obtaining a function NTS1(L) of a distance L.

As the above reference value, the amount of the laser beam measured by the photodetector may be used, for example. Alternatively, based on the output of the photodetector or a drive current of the laser, it is determined whether the amount of the laser beam is normal or abnormal. Then, when the amount of the laser beam is normal, a predetermined value may be used. As the amount of the laser beam, an average value or an integrated value may be used.

Moreover, the data processor 30 acquires an intensity distribution of backscattered light NTS2 by making a laser beam incident from the other end side of the optical fiber 26 (see FIG. 6B). Then, the data processor 30 uses a reference value generated in the same manner as NTS1 to normalize the acquired intensity distribution of the backscattered light NTS2, thereby obtaining a function NTS2(L) of the distance L.

Next, the processing moves to Step S12 where the data processor 30 calculates a normalization function for each distance using NTS1(L) and NTS2(L), and generates a normalized backscattering variation.

Figure 13:
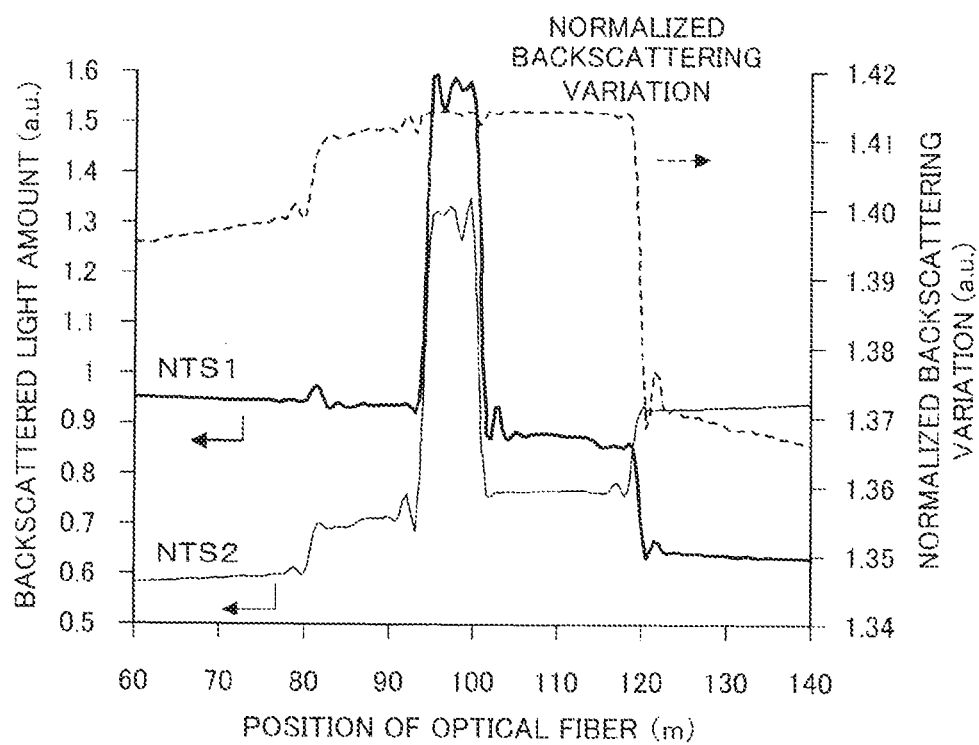
FIG. 13 is a graph illustrating the intensity distributions of the backscattered light NTS1 and NTS2 and the normalized backscattering variation.

FIG. 13 is a graph illustrating the intensity distributions of the backscattered light NTS1 and NTS2 and the normalized backscattering variation. As illustrated in FIG. 13, in the normalized backscattering variation, a step caused by temperature gradients of the intensity distributions of the backscattered light NTS1 and NTS2 is suppressed, and a large step is generated in a connector portion (position of about 81.5 m) and a portion (position of about 120 m) to which stress is applied.

Next, the processing moves to Step S13 where the data processor 30 causes the differential FIR filter to act on (convolution) the normalized backscattering variation. Then, an absolute value as a result of the action of the FIR filter is obtained as the normalized backscattering variation after the FIR filtering.

Figure 14:
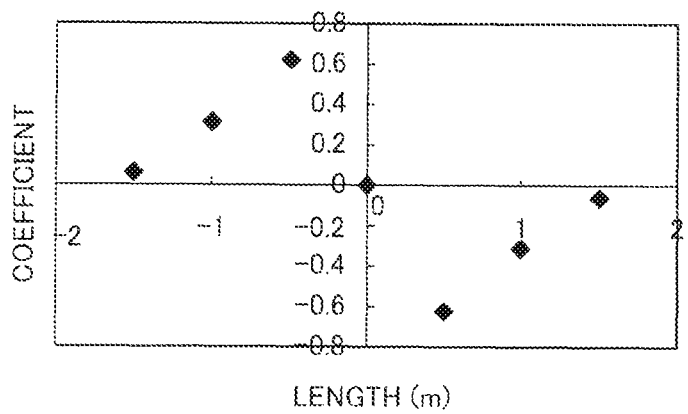
FIG. 14 is a diagram illustrating an example of an FIR filter.

The differential FIR filter is a filter including a differential function and a high cutoff function by weighted smoothing. FIG. 14 illustrates an example of the FIR filter used in this embodiment. In this embodiment, as the FIR filter, a function is used, which takes 0 at the origin and is symmetrical about the origin and whose absolute value becomes large as it approaches the origin and approaches 0 as it gets farther away from the origin.

Figure 15:
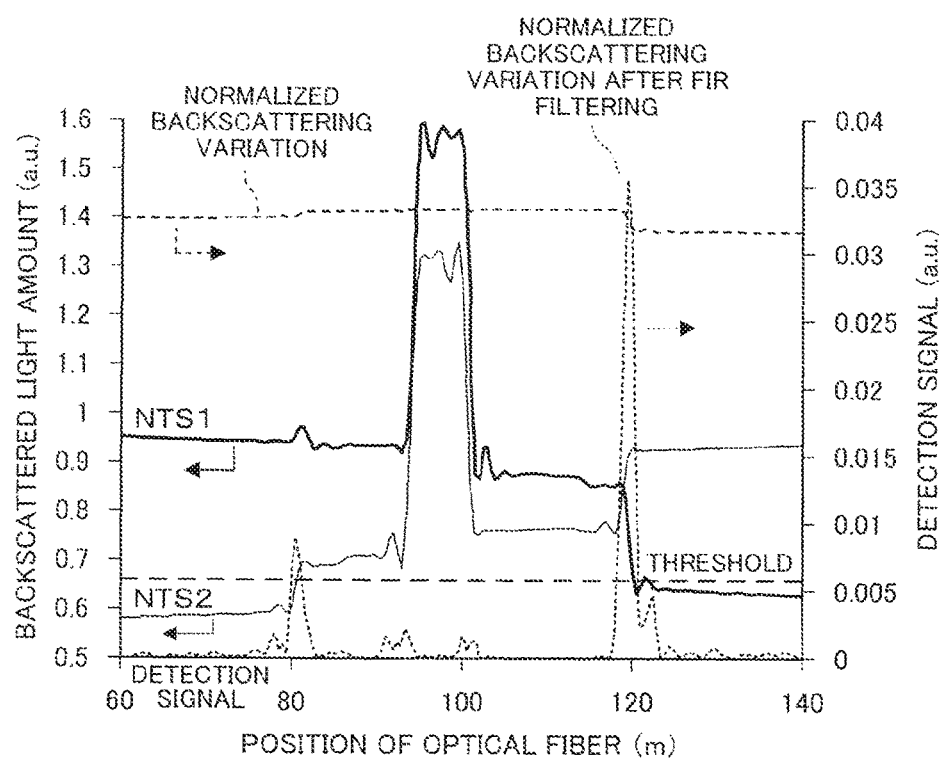
FIG. 15 is a graph illustrating the normalized backscattering variation after FIR filtering together with the intensity distributions of the backscattered light NTS1 and NTS2 and the normalized backscattering variation before the FIR filtering.

FIG. 15 is a graph illustrating the normalized backscattering variation after the FIR filtering together with the intensity distributions of the backscattered light NTS1 and NTS2 and the normalized backscattering variation before the FIR filtering.

As may be seen from FIG. 15, when the differential FIR filter acts on the normalized backscattering variation, the step portion in the normalized backscattering variation becomes a peak, and a change in light amount is highlighted.

In the example illustrated in FIG. 15, even though peaks due to the influence of a large temperature gradient are generated at the positions of about 92 m and about 103 m, such peaks are low.

Thereafter, the processing moves to Step S14 where the data processor 30 extracts a peak whose local maximum value exceeds a threshold from the graph of the normalized backscattering variation after the FIR filtering.

In the example illustrated in FIG. 15, since the background noise is about 0.0006, the threshold is set to ten times as large as the background noise. Accordingly, the peaks due to the influence of the temperature gradient at the positions of about 92 m and about 103 m are excluded from the extraction targets. Note that the threshold may be set as appropriate according to the system design, and does not have to be ten times as large as the background noise.

Moreover, even if there is a peak whose local maximum value exceeds the threshold, if there is a larger peak within ±2 m from the peak, the peak is treated as noise associated with the larger peak. This is because the distance resolution of the system is about 1 m, and thus when there are a large peak and a small peak within ±2 m, the small peak is likely to be noise of the large peak. Furthermore, even if the small peak and the large peak are caused by different abnormalities, it is considered that there is no problem to put out an alert as the same abnormality.

Next, in Step S15, the data processor 30 determines whether or not the backscattered light NTS1 and NTS2 have opposite phases at the peak position. As for the determination of whether or not the backscattered light NTS1 and NTS2 have opposite phases, a method to be described later, a method for extracting a position of a local maximum value having a predetermined magnitude or more after second order differentiation of the intensity distributions of the backscattered light NTS1 and NTS2, and the like are available.

If it is determined in Step S15 that the backscattered light NTS1 and NTS2 have the same phase (if NO), the processing moves to Step S19. Then, in Step S19, the data processor 30 stores the peak as one caused by the optical fiber connection portion. Thereafter, the processing moves to Step S20.

On the other hand, if it is determined in Step S15 that the backscattered light NTS1 and NTS2 have opposite phases at the peak position (if YES), the processing moves to Step S16.

In Step S16, the data processor 30 refers to installation data to determine whether or not the peak position is the optical fiber connection portion.

In the example illustrated in FIG. 15, a peak larger than the threshold is generated at the position of 80.5 m. Also, the fact that the connector is located at the position of 81.5 m is recorded in the installation data. There is a difference of 1 m between the peak position in the normalized backscattering variation after the FIR processing and the connector position in the installation data. However, such a difference is within the range of ±2 m described above. Thus, the data processor 30 determines that the peak at the position of 80.5 m is caused by the optical fiber connection portion. Therefore, in this case (if YES in Step S16), the processing moves to Step S19. Then, in Step S19, the data processor 30 stores the peak at the position of 80.5 m as transmission loss caused by the optical fiber connection portion. Thereafter, the processing moves to Step S20.

In Step S20, the data processor 30 performs system check. For example, the data processor 30 refers to the data in the past to check if there is a significant change in the amount of transmission loss at the optical fiber connection portion. Then, when it is determined that there is no significant change in the amount of transmission loss, the processing is terminated as there is no abnormality. On the other hand, when it is determined that there is a significant change in transmission loss, it is conceivable that some kind of abnormality has occurred in the optical fiber connection portion. Thus, the data processor 30 executes processing such as putting out an alert.

On the other hand, if it is determined in Step S16 that the peak position is not the optical fiber connection portion (if NO), the processing moves to Step S17.

In the example illustrated in FIG. 15, a large peak is generated at the position of 119.5 m. However, the installation data includes no data of the optical fiber connection portion at the position within ±2 m from 119.5 m. Therefore, in Step S17, the data processor 30 stores the peak located at 119.5 m as transmission loss caused by application of external force.

Thereafter, the processing moves from Step S17 to Step S18 where the data processor 30 performs sign analysis. For example, the data processor 30 compares the amount of transmission loss (for example, the magnitude of the detection signal in FIG. 13) caused by the application of external force with the data in the past. Then, if the amount of transmission loss is the same as that when there is no abnormality in the past, the processing is terminated as there is no abnormality.

However, if the amount of transmission loss caused by the application of external force is significantly different from the amount of transmission loss when there is no abnormality in the past, such transmission loss, if left as it is, may lead to a serious accident. In this case, the data processor 30 performs processing such as putting out an alert indicating an abnormality. Note that, when the amount of transmission loss due to the application of external force is outside the preset range, an alert may be put out.

In this embodiment, sensitivity equal to or more than three times as high as that in the method for second order differentiation of the intensity distribution of the backscattered light (see FIG. 4) is achieved. Thus, according to this embodiment, an abnormality occurring in a facility such as a chemical plant, a refinery, and a fossil-fuel power station may be detected in an early stage, achieving an effect that a serious accident may be prevented.

Figure 16:
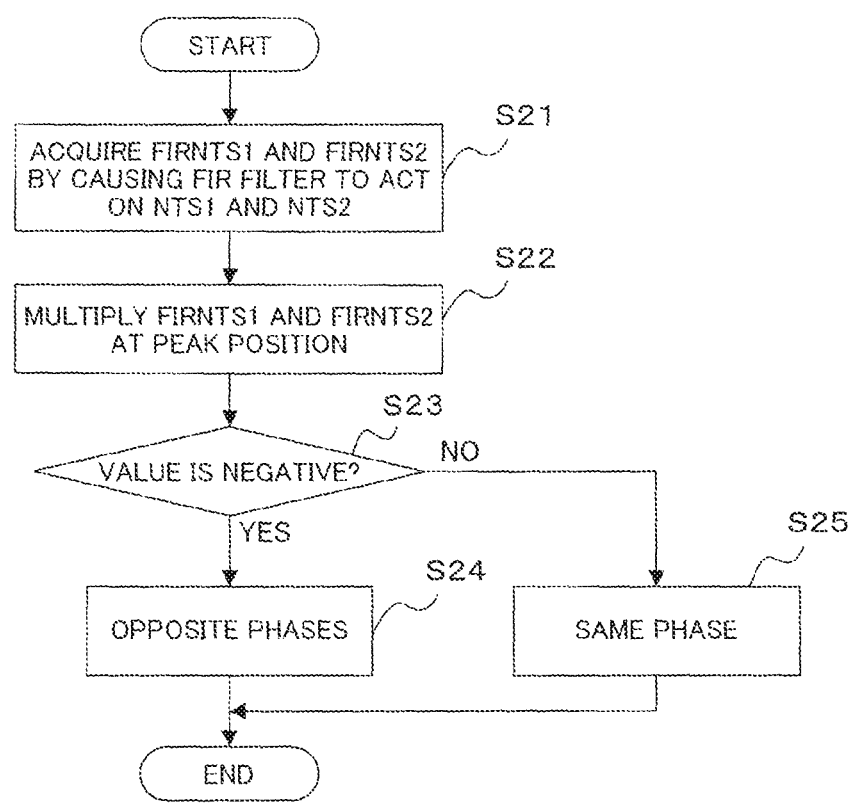
FIG. 16 is a flowchart illustrating an example of a method for determining the phases of the backscattered light NTS1 and NTS2.

Hereinafter, with reference to a flowchart illustrated in FIG. 16, description is given of an example of the method for determining the phases of the backscattered light NTS1 and NTS2 in Step S15.

First, in Step S21, the data processor 30 causes the differential FIR filter to act on (convolution) the intensity distributions of the backscattered light NTS1 and NTS2. When the differential FIR filter acts on the intensity distributions of the backscattered light NTS1 and NTS2, a function (graph) having less noise and a peak corresponding to a change in light amount is obtained. Here, again, a filter having the characteristics illustrated in FIG. 14 is used as the differential FIR filter.

Hereinafter, a function obtained by the FIR filter acting on the intensity distribution of the backscattered light NTS1 is called FIRNTS1, and a function obtained by the FIR filter acting on the intensity distribution of the backscattered light NTS2 is called FIRNTS2.

Figure 17:
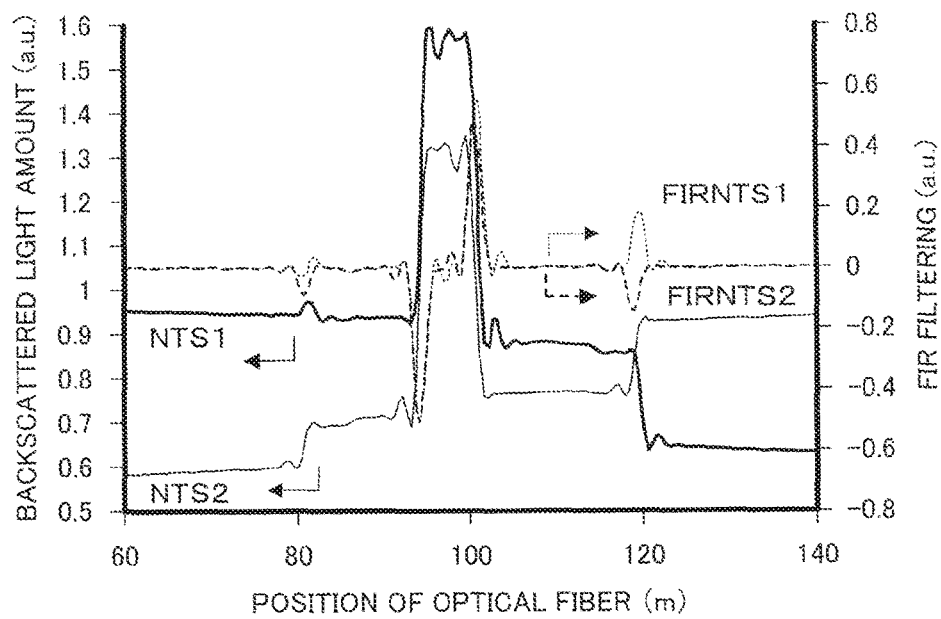
FIG. 17 is a graph illustrating the intensity distributions of the backscattered light NTS1 and NTS2 as well as functions FIRNTS1 and FIRNTS2.

FIG. 17 is a graph illustrating the intensity distributions of the backscattered light NTS1 and NTS2 as well as the functions FIRNTS1 and FIRNTS2. In the example illustrated in FIG. 17, the function FIRNTS1 has positive peaks at the positions of about 80 m, about 100 m, and about 120 m, and a negative peak at the position of about 92 m. Meanwhile, the function FIRNTS2 has a positive peak at the position of about 100 m and negative peaks at the positions of about 80 m, about 92 m, and about 120 m.

Next, the processing moves to Step S22 where the data processor 30 performs multiplication of the peak values at the respective peak positions in the functions FIRNTS1 and FIRNTS2. Thereafter, the processing moves to Step S23 to determine whether or not the result of the calculation is negative for each of the peak positions.

If the result of the calculation is negative, it may be determined that changes in amounts of the backscattered light NTS1 and NTS2 at the peak position have opposite phases. On the other hand, if the result of the calculation is 0 or positive, it may be determined that changes in amounts of the backscattered light NTS1 and NTS2 at the peak position have the same phase.

If it is determined in Step S23 that the result of the calculation is negative (if YES), the processing moves to Step S24 to determine that the changes in amounts of the backscattered light NTS1 and NTS2 at the peak position have opposite phases, and then returns to Step S15 in FIG. 12.

On the other hand, if it is determined in Step S23 that the result of the calculation is 0 or positive (if NO), the processing moves to Step S25 to determine that the changes in amounts of the backscattered light NTS1 and NTS2 at the peak position have the same phase, and then returns to Step S15 in FIG. 12.

In the example illustrated in FIG. 17, the result of the calculation has negative values at the positions of about 80 m and about 120 m, and has positive values at the positions of about 92 m and about 100 m. More specifically, it may be seen that the changes in amounts of the backscattered light NTS1 and NTS2 have opposite phases at the positions of about 80 m and about 120 m and have the same phase at the positions of about 92 m and about 100 m.

Hereinafter, description is given of an experiment of confirming that stress may be measured using the optical fiber, and the result thereof.

Figure 18:
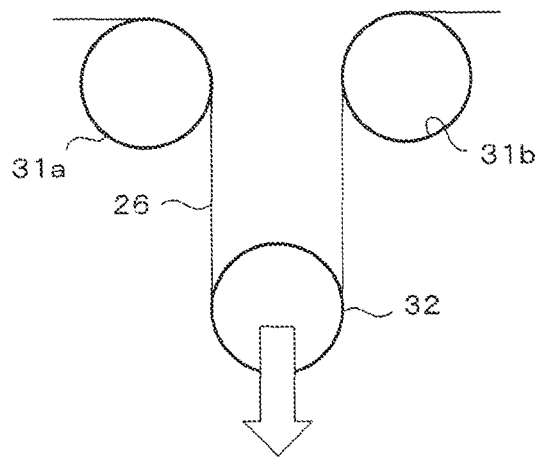
FIG. 18 is a diagram illustrating an experimental method for confirming that stress may be measured by the optical fiber.

As illustrated in FIG. 18, three circular bobbins 31a, 31b, and 32 are prepared, each having a radius larger than a minimum allowable bending radius of the optical fiber 26. Then, the bobbins 31a and 31b are fixed to a support (not illustrated), the optical fiber 26 is hung between the bobbins 31a and 31b, and the bobbin 32 is disposed in the middle thereof.

A spring scale (not illustrated) is attached to the bobbin 32 to enable a desired tensile stress to be applied to the optical fiber 26 between the bobbins 31a and 31b by pulling the bobbin 32 downward through the spring scale. Moreover, the optical fiber 26 and the bobbins 31a and 31b are joined with a tape, thereby allowing the tensile stress to be applied to the optical fiber 26 between the bobbins 31a and 31b.

Both ends of the optical fiber 26 are connected to the photodetector 20 (see FIG. 5) to measure the intensity distributions of the backscattered light NTS1 and NTS2. Also, the data processor 30 (see FIG. 5) performs data processing to acquire a normalized backscattering variation and a normalized backscattering variation after FIR processing. Note that, when the normalized backscattering variation is acquired, it is confirmed that NTS1(L) and NTS2(L) have opposite phases.

Figure 19A:
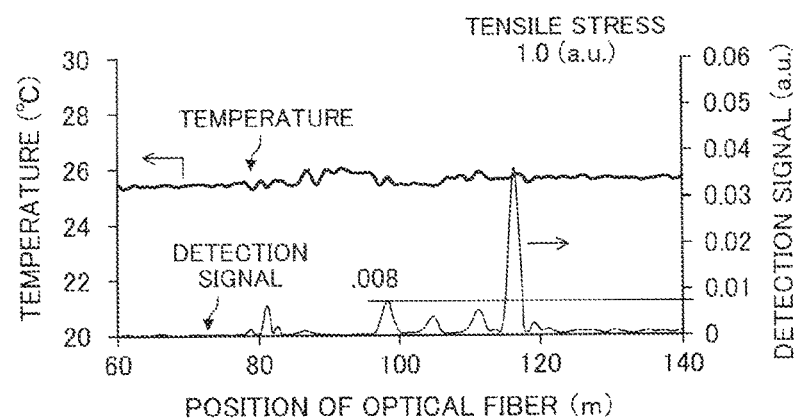
FIGS. 19A to 19C are graphs illustrating the normalized backscattering variation and the normalized backscattering variation after the FIR filtering.
Figure 19B:
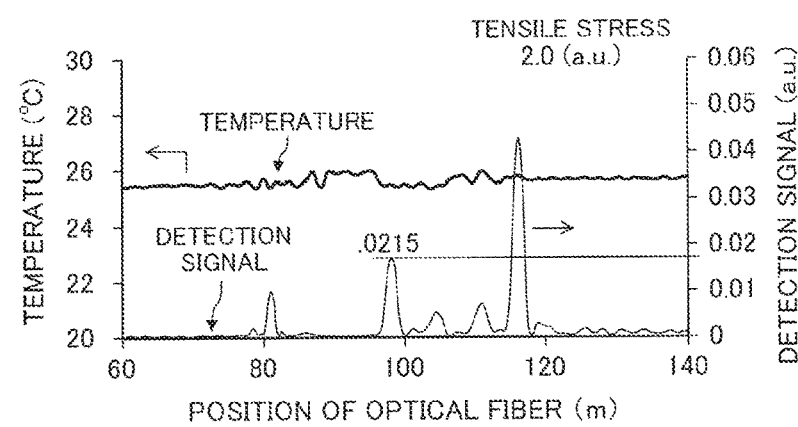
Figure 19C:
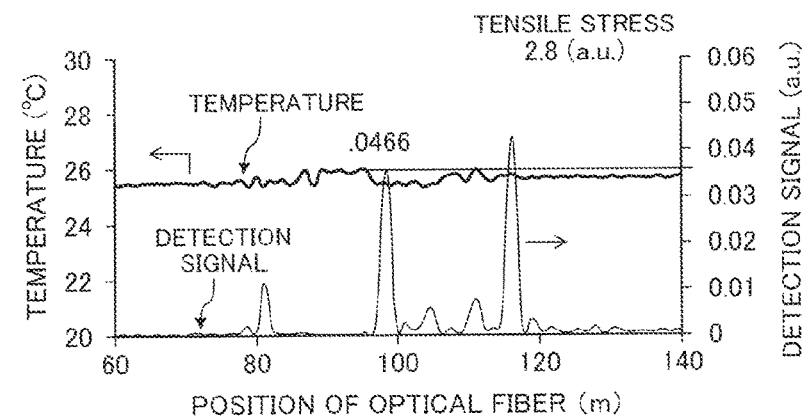
Figure 20:
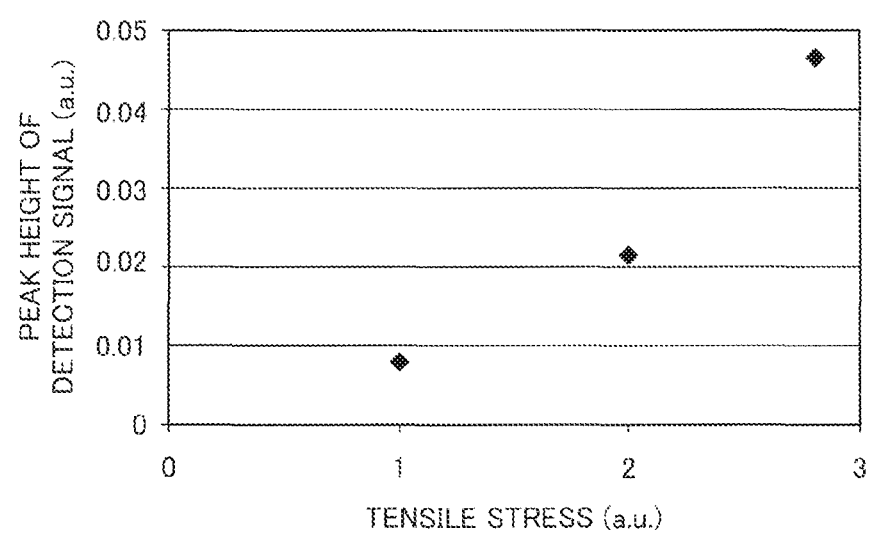
FIG. 20 is a graph with the horizontal axis representing tensile stress and the vertical axis representing the peak height of the normalized backscattering variation after the FIR filtering, illustrating a relationship therebetween.

FIGS. 19A to 19C are graphs with the horizontal axis representing the position of the optical fiber and the vertical axis representing the temperature and the peak height of the normalized backscattering variation after the FIR filtering, in other words, a detection signal, illustrating a relationship thereamong. FIG. 20 is a graph with the horizontal axis representing the tensile stress and the vertical axis representing the peak height of the normalized backscattering variation after the FIR filtering, illustrating a relationship therebetween.

FIG. 19A is a graph when a medium degree of tensile stress is applied to the bobbin 32. FIG. 19B is a graph when tensile stress twice as large as that of FIG. 19A is applied. FIG. 19C is a graph when tensile stress 2.8 times as large as that of FIG. 19A is applied. In FIGS. 19A to 19C, peaks around 98 m are caused by the tensile stress.

From FIGS. 19A to 19C, it may be seen that the detection signal changes according to the strength of the tensile stress applied to the optical fiber 26. Also, it may be seen from FIG. 20 that the peak height of the detection signal quadratically changes with respect to the tensile stress.

Figure 21:
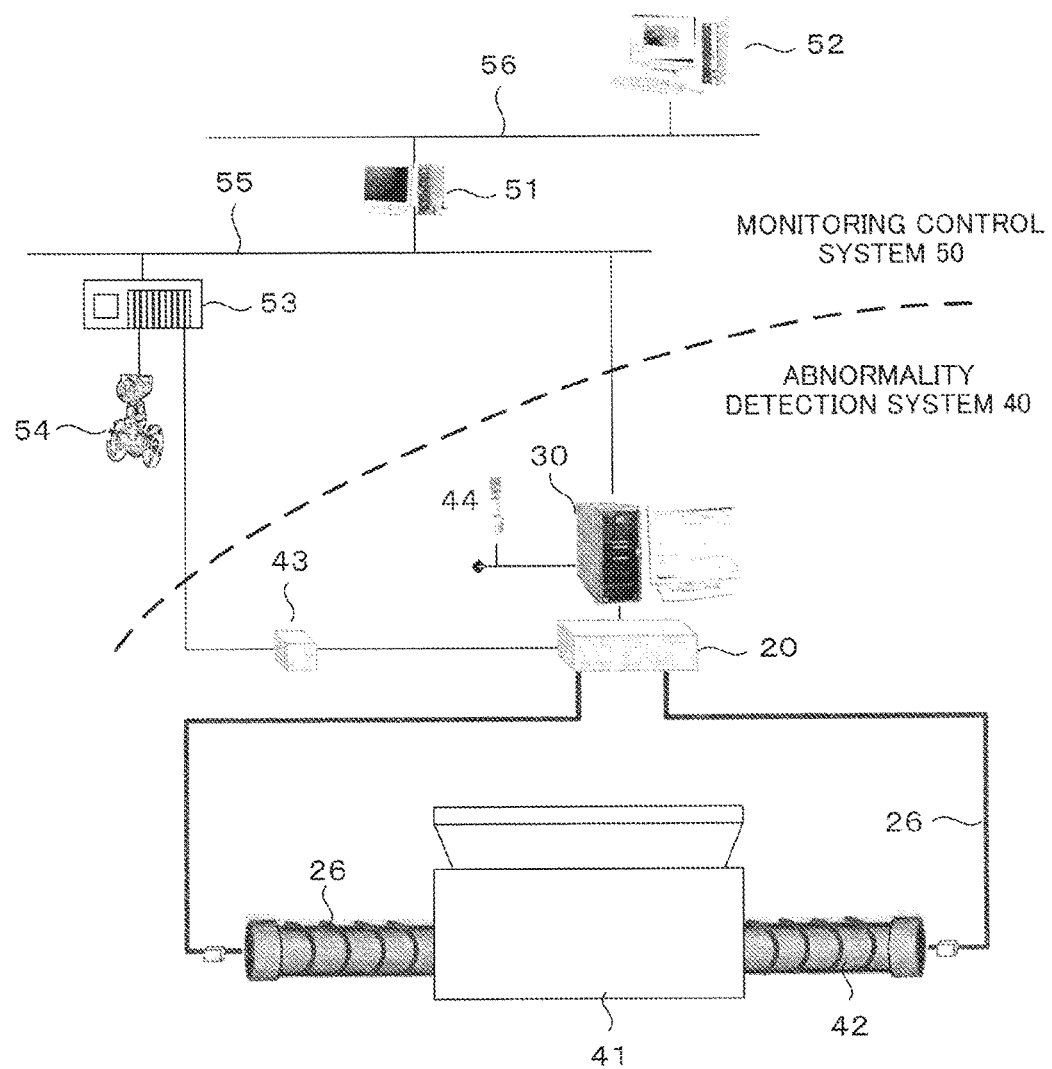
FIG. 21 is a block diagram illustrating an example of a chemical plant monitoring system to which the abnormality detection system according to this embodiment is applied.

FIG. 21 is a block diagram illustrating an example of a chemical plant monitoring system to which the abnormality detection system according to this embodiment is applied.

The chemical plant monitoring system illustrated in FIG. 21 includes: an abnormality detection system 40 for monitoring whether or not there is an abnormality in a chemical reactor 41 and a pipe 42; and a monitoring control system 50 for state monitoring and controlling of the entire chemical plant.

In the example illustrated in FIG. 21, the optical fiber 26 is installed on the outer surface of the chemical reactor 41 and on the pipe 42 connected to the chemical reactor 41. The abnormality detection system 40 is constructed using the optical fiber 26, the photodetector 20, and the data processor 30.

The abnormality detection system 40 sequentially updates the history of transmission loss of the optical fiber 26, thereby detecting deformation of the pipe 42, fracture at a joint, abnormal expansion or contraction due to a problem with an operating condition of the chemical reactor 41, and the like. Upon detection of an abnormality by the data processor 30, the abnormality detection system 40 activates a monitoring warning light 44, a buzzer or the like to notify an operator of the abnormality.

Note that, in the example illustrated in FIG. 21, a distributed temperature sensor (DTS) is used as the photodetector 20, which may measure a temperature distribution in the longitudinal direction of the optical fiber 26. Temperature data in a preset section is sent to an I/O device 53 through an external contact 43, and is used for opening and closing control of an electromagnetic valve 54 and the like, for example.

The abnormality detection system 40 is connected to the monitoring control system 50 through a transmission control LAN 55. The monitoring control system 50 includes: a monitoring control server 51 for monitoring the states of the I/O device 53, the abnormality detection system 40, and the like through the transmission control LAN 55; and a monitoring console 52 connected to the monitoring control server 51 through a man-machine LAN 56. The monitoring console 52 enables the states of different positions within the plant to be monitored and also enables the electromagnetic valve 54 and the like to be operated through the I/O device 53.

In the example illustrated in FIG. 21, the abnormality detection system 40 is connected to the monitoring control system 50, but is configured as an independent local system. The purpose of this is because the other parts will not be affected by shutdown of the abnormality detection system 40 for some reason.

The applicability of the disclosed technology is described below.

(Applicability 1) FIGS. 22A to 22D illustrate a case where the abnormality detection system described in the embodiment is applied to abnormality detection in pipe junction as illustrated in FIG. 1.

Figure 22A:
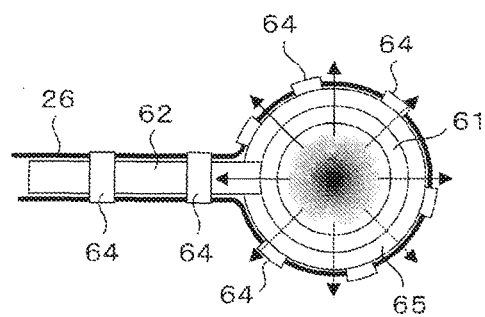
FIGS. 22A to 22D are diagrams illustrating Applicability 1.

As illustrated in FIG. 22A, it is assumed that a high-temperature liquid or gas flows inside a main pipe 61 during operation of the plant. In this case, the main pipe 61 expands during operation of the plant, and contracts during shutdown of the plant. The data processor 30 stores the amount of loss of the optical fiber 26 during operation of the plant and during shutdown thereof.

Note that, in FIGS. 22A to 22D, reference numeral 64 denotes a tape to fix the optical fiber 26, and reference numeral 65 denotes a heat insulator and a protecting tube, which are disposed around the main pipe 61.

Figure 22C:
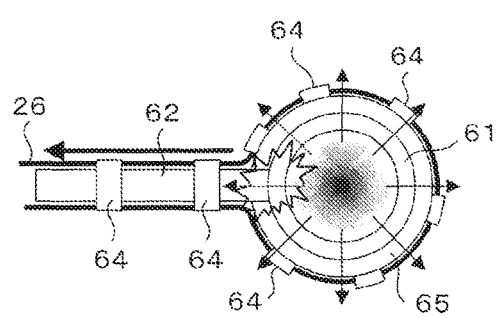
Figure 22B:
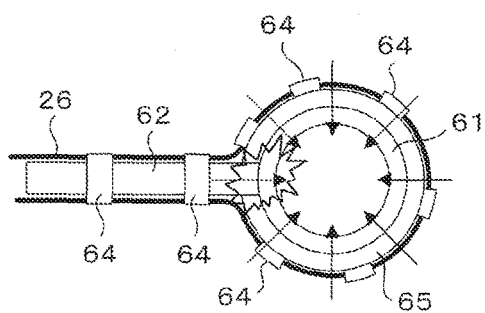
Figure 22D:
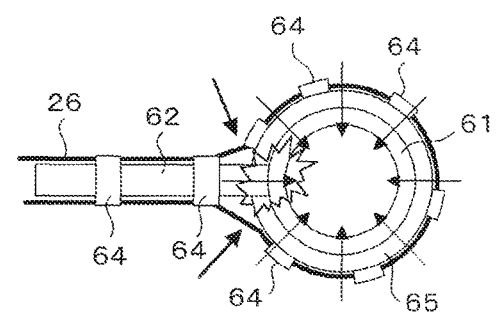

When metal fatigue occurs in a joint welded part between the main pipe 61 and a branch pipe 62 along with the shutdown of the plant, for example, as illustrated in FIG. 22B, the branch pipe 62 is pushed out more than usual in the next operation as illustrated in FIG. 22C. Then, in the next shutdown state, as illustrated in FIG. 22D, the pushed branch pipe 62 is not fully returned and pulls the optical fiber 26, and the abnormality detection system detects an abnormality.

As described above, an abnormality in the pipe junction in the plant or the like is detected in an early stage, thereby avoiding occurrence of a serious accident.

Figure 23:
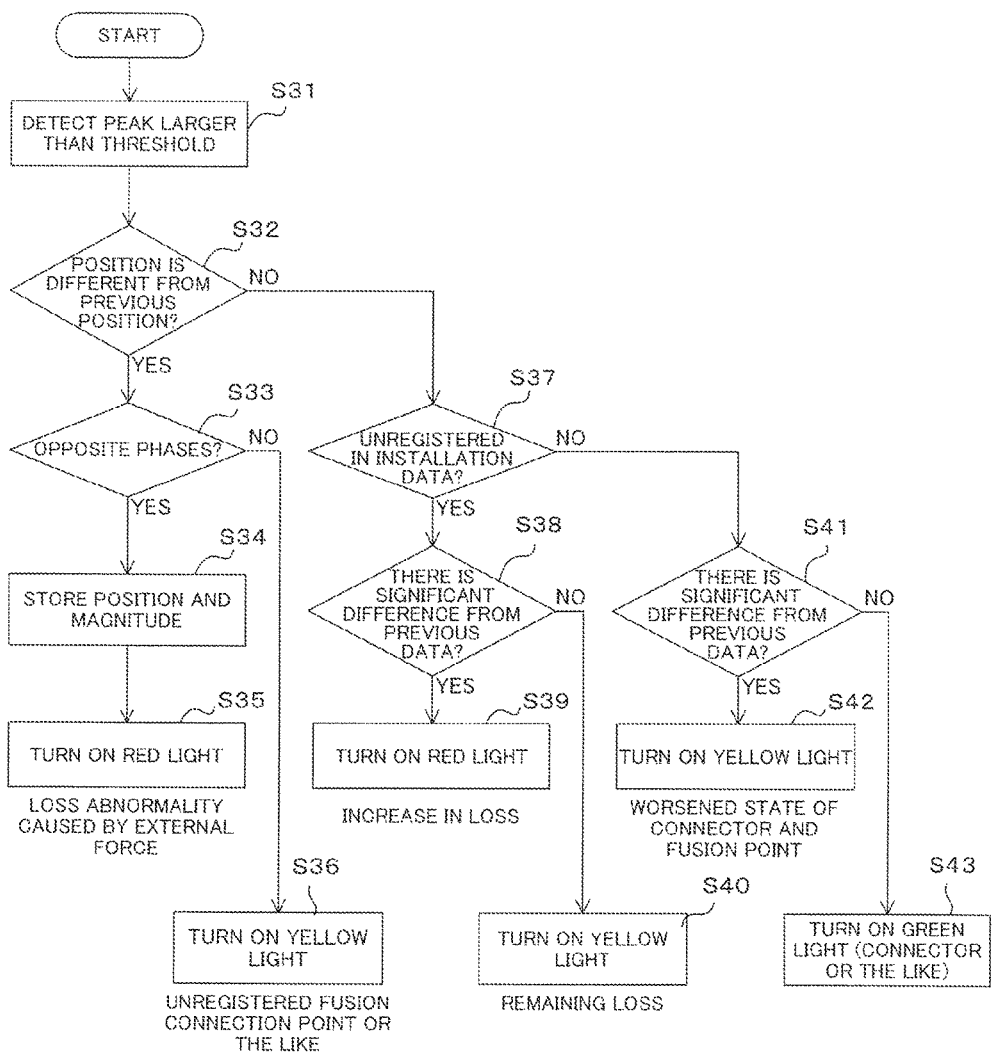
FIG. 23 is a flowchart illustrating generation of an alert in the abnormality detection system.

FIG. 23 is a flowchart illustrating generation of an alert in the abnormality detection system.

First, upon detection of a peak (see FIG. 15) larger than a threshold in Step S31, the processing moves to Step S32 to determine whether or not the peak position is different from the previous position. If it is determined in Step S32 that the peak position is the same as the previous position (if YES), the processing moves to Step S33. On the other hand, if it is determined in Step S32 that the peak position is not the same as the previous position (if NO), the processing moves to Step S37.

In Step S33, it is determined whether or not the backscattered light NTS1 and NTS2 have opposite phases. If NTS1 and NTS2 have opposite phases (if YES), the processing moves to Step S34. On the other hand, if NTS1 and NTS2 have the same phase (if NO), the processing moves to Step S36.

When the processing moves from Step S33 to Step S34, the position and magnitude of the peak are stored. Then, the processing moves to Step S35 to turn on a red light. This lighting of the red light represents a loss abnormality due to external force.

On the other hand, when the processing moves from Step S33 to Step S36, a yellow light is turned on. This lighting of the yellow light represents the presence of an unregistered fusion connection point or the like.

When the processing moves from Step S32 to Step S37, it is determined whether or not the peak position is unregistered in the installation data. If the peak position is unregistered (if YES), the processing moves to Step S38. On the other hand, if the peak position is registered (if NO), the processing moves to Step S41.

When the processing moves from Step S37 to Step S38, it is determined whether or not there is a significant difference from the previous data. If it is determined that there is a significant difference (if YES), the processing moves to Step S39 to turn on the red light. This lighting of the red light represents an increase in loss.

On the other hand, if it is determined in Step S38 that there is no significant difference from the previous data (if NO), the processing moves to Step S40 to turn on the yellow light. This lighting of the yellow light represents the remaining loss.

When the processing moves from Step S37 to Step S41, again, it is determined whether or not there is a significant difference from the previous data. If it is determined that there is a significant difference (if YES), the processing moves to Step S42 to turn on the yellow light. This lighting of the yellow light represents the worsened connection condition of the fusion position of the optical fiber or the connector.

On the other hand, if it is determined in Step S41 that there is no significant difference (if NO), the processing moves to Step S43 to turn on a green light. This lighting of the green light represents that the peak is caused by the connector or the like and there is no abnormality.

In the example illustrated in FIG. 23, minute changes in transmission loss of the optical fiber may be captured, and may be separated into one caused by external force and one caused by the connector or fusion. Then, the transmission loss exceeding the set threshold is registered as sequential data, which is used for instruction determination of a display level of the monitoring warning light during the next data collection and thereafter. Thus, the system may also be used as a health check function to check if there is a large shift in the pipe after an earthquake or the like occurs, for example.

(Applicability 2)

Figure 24:
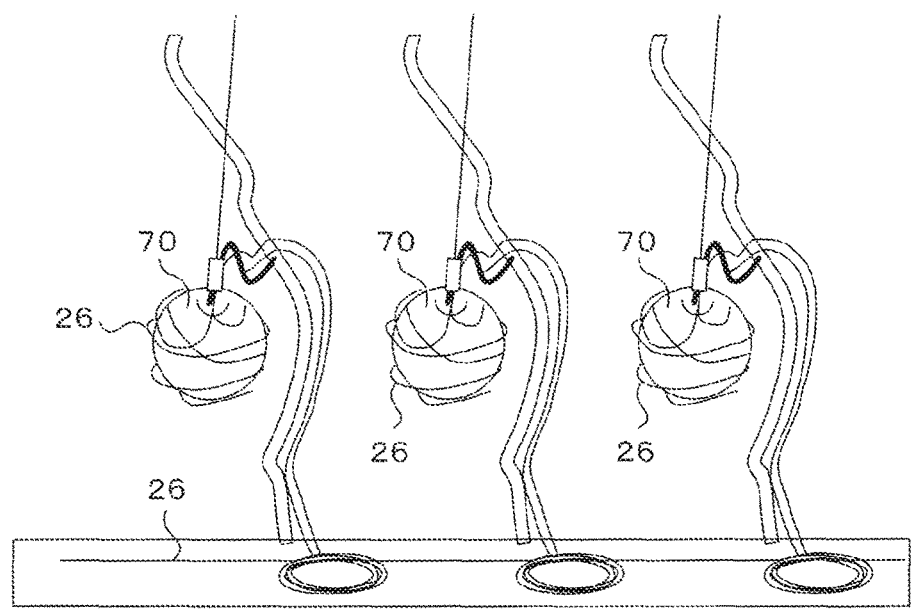
FIG. 24 is a diagram illustrating Applicability 2.

FIG. 24 illustrates a case where the abnormality detection system described in the embodiment is applied to growing of premium fruits and protection against theft thereof in a plastic greenhouse.

Here, in growing of crown melons in a greenhouse, the soil temperature, surrounding environment temperature, and the temperature of the fruits are measured by the distributed temperature sensor (DTS), and the temperature in the greenhouse is managed based on the measurement result. Moreover, here, the distributed temperature sensor is also used as the photodetector 20 in FIG. 5, and is connected to the data processor 30 for use in abnormality detection.

When a burglar tries to steal melons 70, for example, the burglar tries to unwind the optical fibers 26 wound around the melons 70. The optical fibers 26 are not cut off if the burglar operates carefully. However, occurrence of minute transmission loss is inevitable when the burglar tries to unwind the optical fibers 26. Thus, the abnormality detection system may detect the abnormality.

When the abnormality detection system detects the abnormality, the occurrence of the abnormality is notified to a manager along with lighting of a patrol lamp and activation of a warning buzzer. Thus, serious damage may be suppressed.

(Other Applicability) Optical fibers may be attached to a bridge such as a railroad bridge, and an abnormality in the bridge may be detected by the disclosed abnormality detection system. This makes it possible to determine whether or not there is an abnormality in the bridge when an earthquake occurs, for example, or to estimate the timing of maintenance.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An abnormality detection system comprising:
   an optical fiber;
   a backscattered light detector connected to one end side and another end side of the optical fiber, and configured to acquire a first intensity distribution of backscattered light by making light enter the optical fiber through the one end side and to acquire a second intensity distribution of backscattered light by making light enter the optical fiber through the other end side; and
   a data processor configured to calculate transmission loss at positions in a longitudinal direction of the optical fiber by using the first and second intensity distributions and a normalization function in which an influence of a temperature gradient is reduced to detect an abnormality caused by an external force, and to determine whether or not there is the abnormality based on a result of the calculation.

2. The abnormality detection system according to claim 1, wherein
   when the intensity in the first intensity distribution at any position L of the optical fiber is $K1 \cdot a$ (where a is the intensity at the position L assuming that there is no peak in the first intensity distribution) and the intensity in the second intensity distribution at the position L is $K2 \cdot b$ (where b is the intensity at the position L assuming that there is no peak in the second intensity distribution), the normalization function satisfies a condition (1) that the normalization function takes a constant value when K1=K2 and a condition (2) that the normalization function takes a value different from the constant value when K1≠K2, and when a function obtained by normalizing the first intensity distribution is NTS1(L) and a function obtained by normalizing the second intensity distribution is NTS2(L), the normalization function satisfies a condition (3) that the normalization function is an even function with a central axis of NTS1(L)/NTS2(L)=1 when NTS1(L)/NTS2(L) is a horizontal axis (logarithmic axis) and a condition (4) that the normalization function takes a maximum value or a minimum value when NTS1(L)=NTS2(L) and has a finite value even when either of the maximum value or the minimum value infinitely approaches zero.

3. The abnormality detection system according to claim 2, wherein
each of the function NTS1(L) and the function NTS2(L) is normalized using an amount of laser beam at a time of measurement.

4. The abnormality detection system according to claim 1, wherein
the backscattered light detector is a distributed temperature sensor or an optical pulse detector (Optical Time Domain Reflectometer).

5. The abnormality detection system according to claim 2, wherein
the data processor extracts a peak of a local maximum value larger than a threshold from a distribution obtained by causing a first differential FIR (Finite Impulse Response) filter to act on a normalized backscattering variation obtained by inputting the function NTS1(L) and the function NTS2(L) to the normalization function, and then obtaining an absolute value of an obtained value.

6. The abnormality detection system according to claim 5, wherein
the data processor extracts a position where a product of results obtained by causing a second differential FIR (Finite Impulse Response) filter to act on the function NTS1(L) and the function NTS2(L) is negative.

7. The abnormality detection system according to claim 6, wherein
the data processor checks an optical fiber connection portion recorded in installation data against the negative position, and determines, based on a result of the checking, whether the negative position is the optical fiber connection portion or a position where stress is applied to the optical fiber.

8. The abnormality detection system according to claim 5, wherein
the data processor estimates stress applied to the optical fiber from a peak height of the peak larger than the threshold after the extraction.

9. The abnormality detection system according to claim 5, wherein
the data processor compares a peak height of the peak larger than the threshold after the extraction with data in a past, and determines whether or not there is an abnormality based on a result of the comparison.

10. The abnormality detection system according to claim 1, wherein
when a function obtained by normalizing the first intensity distribution is NTS1(L) and a function obtained by normalizing the second intensity distribution is NTS2(L), the normalization function is represented by the following expression:

$$\frac{(NTS1(L) + NTS2(L))}{\sqrt{(NTS1(L)^2 + NTS2(L)^2)}}.$$

11. The abnormality detection system according to claim 1, wherein
when a function obtained by normalizing the first intensity distribution is NTS1(L) and a function obtained by normalizing the second intensity distribution is NTS2(L), the normalization function is represented by the following expression:

$$\frac{\sqrt{(NTS1(L)^2 + NTS2(L)^2)}}{(NTS1(L) + NTS2(L))}.$$

12. An abnormality detection method system, comprising:
acquiring a first intensity distribution of backscattered light by making light enter through one end side of an optical fiber and acquiring a second intensity distribution of backscattered light by making light enter through another end side of the optical fiber; and
calculating transmission loss at positions in a longitudinal direction of the optical fiber by using the first and second intensity distributions and a normalization function in which an influence of a temperature gradient is reduced to detect an abnormality caused by an external force, and determining to determine whether or not there is the abnormality based on a result of the calculation.

13. The abnormality detection method according to claim 12, wherein
when the intensity in the first intensity distribution at any position L of the optical fiber is K1·a (where a is the intensity at the position L assuming that there is no peak in the first intensity distribution) and the intensity in the second intensity distribution at the position L is K2·b (where b is the intensity at the position L assuming that there is no peak in the second intensity distribution), the normalization function satisfies a condition (1) that the normalization function takes a constant value when K1=K2 and a condition (2) that the normalization function takes a value different from the constant value when K1≠K2, and
when a function obtained by normalizing the first intensity distribution is NTS1(L) and a function obtained by normalizing the second intensity distribution is NTS2(L), the normalization function satisfies a condition (3) that the normalization function is an even function with a central axis of NTS1(L)/NTS2(L)=1 when NTS1(L)/NTS2(L) is a horizontal axis (logarithmic axis) and a condition (4) that the normalization function takes a maximum value or a minimum value when NTS1(L)=NTS2(L) and has a finite value even when either of the maximum value or the minimum value infinitely approaches zero.

14. The abnormality detection method according to claim 13, wherein
the function NTS1(L) is obtained by normalizing the first intensity distribution by using an amount of laser beam at a time of measurement of the first intensity distribution, and the function NTS2(L) is obtained by normalizing the second intensity distribution by using an amount of laser beam at a time of measurement of the second intensity distribution.

15. The abnormality detection method according to claim 13, wherein the determining whether or not there is an abnormality includes extracting a peak of a local maximum value larger than a threshold from a distribution obtained by causing a first differential FIR (Finite Impulse Response) filter to act on a normalized backscattering variation obtained by inputting the function NTS1(L) and the function NTS2(L) to the normalization function, and then obtaining an absolute value of an obtained value.

16. The abnormality detection method according to claim 15, wherein the determining whether or not there is an abnormality includes extracting a position where a product of results obtained by causing a second differential FIR (Finite Impulse Response) filter to act on the function NTS1(L) and the function NTS2(L) is negative.

17. The abnormality detection method according to claim 16, wherein the determining whether or not there is an abnormality includes checking an optical fiber connection portion recorded in installation data against the negative position, and determining, based on a result of the checking, whether the negative position is the optical fiber connection portion or a position where stress is applied to the optical fiber.

18. The abnormality detection method according to claim 12, wherein the first intensity distribution and the second intensity distribution are acquired using an optical pulse detector (Optical Time Domain Reflectometer: (OTDR)) or a distributed temperature sensor (DTS).

19. The abnormality detection method according to claim 12, wherein when a function obtained by normalizing the first intensity distribution is NTS1(L) and a function obtained by normalizing the second intensity distribution is NTS2(L), the normalization function is represented by the following expression:

$$\frac{(NTS1(L) + NTS2(L))}{\sqrt{(NTS1(L)^2 + NTS2(L)^2)}}.$$

20. The abnormality detection method according to claim 12, wherein when a function obtained by normalizing the first intensity distribution is NTS1(L) and a function obtained by normalizing the second intensity distribution is NTS2(L), the normalization function is represented by the following expression:

$$\frac{\sqrt{(NTS1(L)^2 + NTS2(L)^2)}}{(NTS1(L) + NTS2(L))}.$$

* * * * *